United States Patent [19]

Nattel

[11] 4,306,109
[45] Dec. 15, 1981

[54] ELECTRICAL WIRING BOX ARRANGEMENTS

[75] Inventor: William Nattel, Montreal, Canada

[73] Assignee: GTE Sylvania Canada Limited, St. Jean, Canada

[21] Appl. No.: 207,488

[22] Filed: Nov. 17, 1980

[51] Int. Cl.³ .............................................. H02G 3/08
[52] U.S. Cl. .................................. 174/51; 174/65 R; 220/3.2
[58] Field of Search .................. 174/51, 53, 65 R; 220/3.2–3.94; 285/128, 129; 339/103 R, 103 B, 103 C, 122 R

[56] References Cited

U.S. PATENT DOCUMENTS

| Re. 23,720 | 10/1953 | Gillespie . | |
|---|---|---|---|
| 2,556,977 | 6/1951 | Paige . | |
| 2,564,341 | 8/1951 | Paige . | |
| 2,706,647 | 4/1955 | Gillespie . | |
| 3,119,895 | 1/1964 | Palmer | 174/51 |
| 3,575,313 | 4/1971 | Trachtenberg et al. | 220/3.3 |
| 3,902,002 | 8/1975 | Smith | 174/51 |
| 4,012,580 | 3/1977 | Arnold | 174/53 |

FOREIGN PATENT DOCUMENTS

| 577589 | 6/1959 | Canada | 174/65 R |
|---|---|---|---|
| 658728 | 3/1963 | Canada . | |

Primary Examiner—Gene Z. Rubinson
Assistant Examiner—D. A. Tone
Attorney, Agent, or Firm—Jerry F. Janssen

[57] ABSTRACT

Electrical wiring box arrangements are provided which include an electrical wiring box and a one-piece cable clamp and electrical wiring device mounting member. The clamp and wiring device mounting member is slideably received in slots in the wiring box wall structure and held in placed against a box wall. The clamp and wiring device mounting member is provided with deflective leg portions which clamp an electrical cable passing through a knock-out opening in the wiring box wall structure. The clamp and wiring device mounting member is further provided with a mounting tab for mounting an electrical wiring device within the box and, in a preferred embodiment, with a grounding wire attachment for use particularly with non-metallic wiring box arrangements.

21 Claims, 8 Drawing Figures

ELECTRICAL WIRING BOX ARRANGEMENTS

BACKGROUND OF THE INVENTION

The present invention relates to electrical wiring boxes. More particularly, it is concerned with electrical wiring boxes having an integral cable clamp and wiring device mounting member.

Metallic electrical wiring boxes have been in wide use for many years. In metallic wiring boxes it is common practice to incorporate threaded ears or tabs in the box walls for mounting electrical wiring devices such as a plug receptacle or switch. Separate clamping members of a variety of designs are used for clamping an electrical cable in knock-out openings of metallic wiring boxes. A self-locking cable clamp of a type useful in metallic wiring boxes is disclosed in copending U.S. Pat. application Ser. No. 171,925, filed July 23, 1980.

Recently, wiring boxes fabricated of thermosetting or thermoplastic resins have been introduced, but many known types of plastic wiring boxes have drawbacks associated with the means by which an electrical wiring device is mounted in the box, or with the means by which a cable is clamped to the box.

Another problem associated with many known plastic wiring boxes is the frequent lack in such boxes of any means by which a mounted wiring device can be electrically grounded. For those wiring devices which lack a grounding lug, there is no place on the device or the box where the grounding conductor of the electrical cable can be attached unless it is attached under the metal mounting stud of the wiring device, a practice with obvious drawbacks.

SUMMARY OF THE INVENTION

Electrical wiring box arrangements of the present invention overcome many of the disadvantages of known prior art arrangements by providing electrical wiring boxes having integral cable clamp and wiring device mounting members.

Electrical wiring box arrangements in accordance with one embodiment of the present invention comprise an electrical wiring box having a clamp and wiring device mounting member; said wiring box including a wall structure having front-to-rear walls and a rear wall therebetween which in combination define a chamber having a forward opening for receiving an electrical wiring device, said wall structure including: a knock-out region for providing a knock-out opening for receiving a cable, first cable engaging means, and positioning means for positioning said clamp and wiring device mounting member adjacent to said knock-out region in said box wall structure; said clamp and wiring device mounting member including: securing means coacting with said mounting means of said wall structure for attaching said clamp and wiring device mounting member to said box wall structure, second cable engaging means for coacting with said first cable engaging means to clamp a cable passing through a knock-out opening in said box wall structure, and means for mounting an electrical wiring device on said clamp and wiring device mounting member.

In a preferred embodiment of the invention, the clamp and wiring device mounting member is further provided with electrical grounding attachment means.

For a better understanding of the present invention, together with other and further objects, advantages and capabilities thereof, reference is made to the following disclosure and appended claims in connection with the above-described drawings.

DETAILED DESCRIPTION

Figure 1:
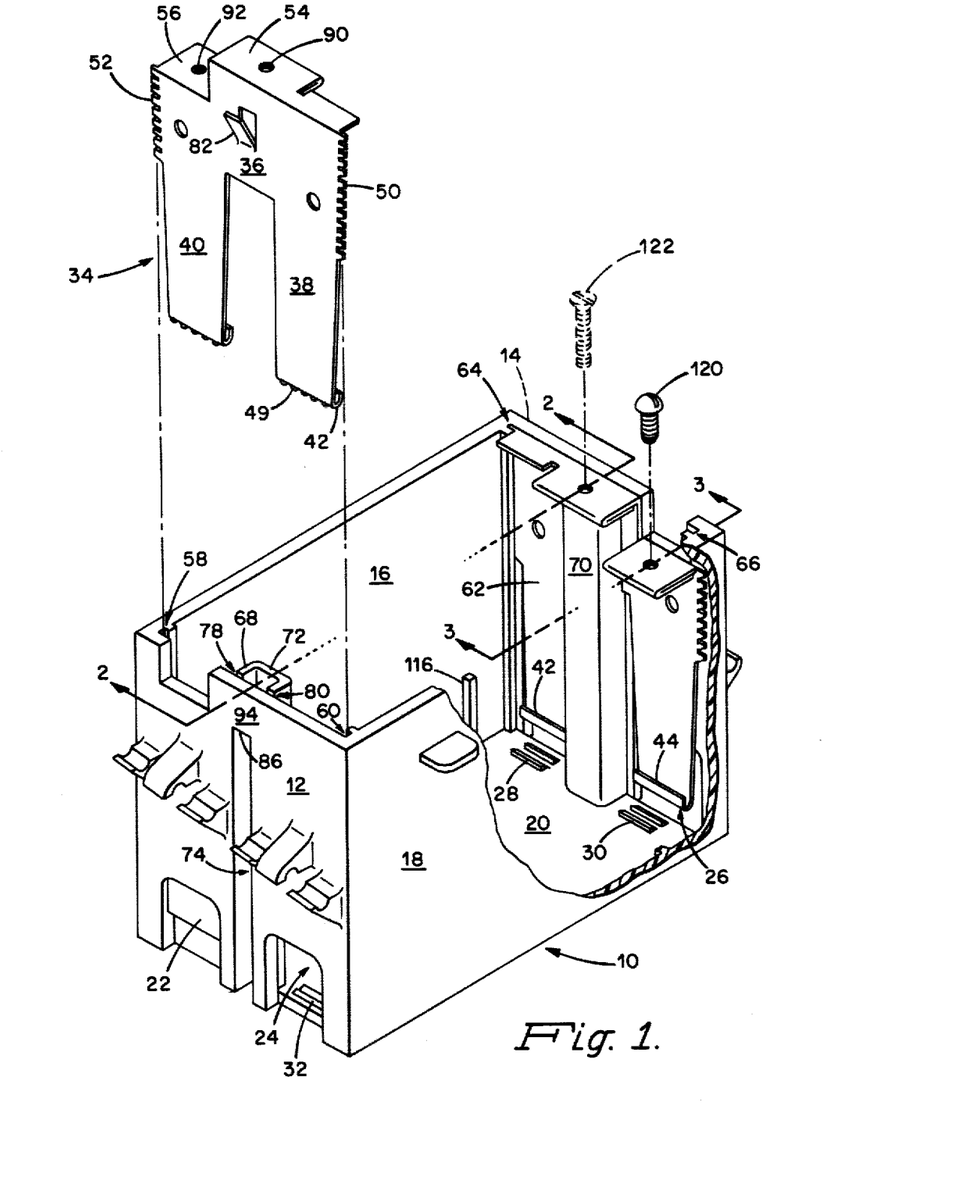
FIG. 1 is an exploded, partially cut-away perspective view of a wiring box arrangement in accordance with one aspect of the invention.

Referring to the drawing figures, an electrical wiring box arrangement in accordance with one embodiment of the present invention is shown in FIG. 1. An electrical wiring box 10 comprises a front-to-rear wall structure including end walls 12 and 14, side walls 16 and 18, and rear wall 20 which in combination define a chamber within the box having a forward opening for receiving an electrical wiring device such as a switch or plug receptacle (not shown).

Figure 3:
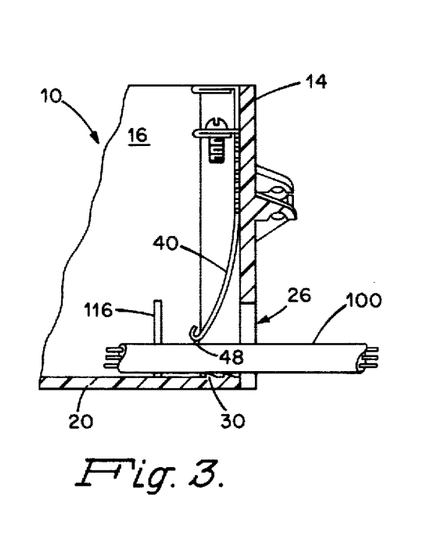
FIG. 3 is a partial cut-away side view of the wiring box arrangement of FIG. 1, the cut taken along line 3—3 of FIG. 1, showing an electrical cable passing through a wall of the box.

The wall structure of wiring box 10 is provided with knock-out regions, typified by knock-out region 22. In a preferred embodiment of the present invention, the wiring box 10 is formed of a molded resin and each knock-out region is closed by a frangible web as shown by knock-out region 22. Prior to insertion of an electrical cable into the box chamber through a wall, the frangible web is removed to provide a knock-out aperture as shown typically by knock-out aperture 24. In a preferred configuration of the wiring box, the knock-out regions are located in the front-to-rear wall structure of the box, immediately adjacent to the box rear wall. For example, in the embodiment shown in FIG. 1, knock-out region 22 is located in end wall 12 immediately adjacent to rear wall 20. Removal of the frangible web from a knock-out region situated immediately adjacent to the intersection of a front-to-rear wall and the rear wall of the box provides a knock-out aperture such as 24 which permits an electrical cable to pass through a side wall and to lie directly along the rear wall of the box. Thus, as shown in FIG. 3, electrical cable 100 passes through knock-out aperture 26 in end wall 14 and lies flat along rear wall 20 of box 10.

The wall structure of the wiring box is further provided with one or more protrusions or ridges for gripping or otherwise engaging a non-metallic sheathed electrical cable. In the embodiment shown in FIG. 1, the cable engaging protrusions take the form of parallel toothed ridges 28, 30 and 32 integrally molded in rear wall 20 of box 10. The cable engaging protrusions in the wall structure of the box are preferably located in the rear wall of the box, in proximity to the knock-out regions. Thus, in FIG. 1, for example, the cable engaging protrusion 30 is located in rear wall 20, in proximity to knock-out aperture 26. As can best be seen by way of example in FIG. 3, this relative orientation of knock-out and cable engaging protrusion allows cable 100 to pass through knock-out aperture 26 and lie along wall 20 in contact with cable engaging protrusion 30.

The electrical wiring box arrangement in accordance with the present invention further includes a cable clamp and wiring device mounting member. In a preferred embodiment of the clamp member 34 shown in FIG. 1, the clamp member is a one-piece, bifurcated member having a substantially flat main body portion 36 with two leg portions 38 and 40 substantially coplanar with the main body portion 36. The clamp and wiring device mounting member is fabricated of a flexible and resilient material such as metal or plastic, preferably thin gage steel which allows leg portions 38 and 40 independently to bend or flex.

Figure 5:
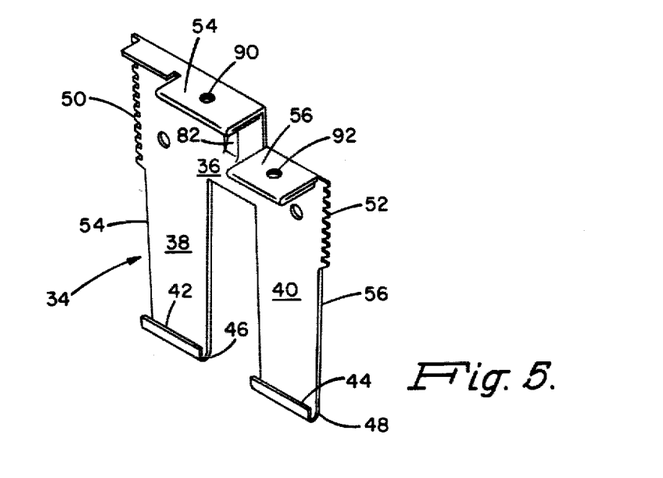
FIG. 5 is a perspective detail view of the clamp member of the wiring box arrangement in accordance with the aspect of the invention depicted in FIG. 1.

Each leg portion of the clamp and wiring device mounting member terminates in a cable engaging foot portion formed by rounding the end of the leg portion into a "J" shaped region. The heel of the rounded foot thus formed provides a surface for contacting and engaging the sheath of an electrical cable. In a preferred embodiment of the invention, the heel of each J-shaped foot portion is provided with a plurality of serrations or protrusions 49 to aid in engaging a cable. As can be seen in FIG. 5, for example, leg portions 38 and 40 of member 34 terminate in feet 42 and 44 having serrated heel regions 46 and 48, respectively.

The main body portion 36 of the clamp and wiring device mounting member 34 has edges 50 and 52 which extend laterally slightly beyond leg portions 38 and 40, respectively, making the member 34 slightly wider at its main body portion 36 than the width from the outside edge 54 of leg 38 to the outside edge 56 of leg 40. The extended edges 50 and 52 of the member 34 are slideably received by slots in the wall structure of the wiring box, and edges 50 and 52 of the member are provided in one embodiment of the invention with multiple serrations to aid in securing the member in the box wall receiving slots, as will be further described hereinbelow.

An electrical wiring device mounting tab 54 is formed at a substantially right angle to the main body portion 36 of the member 34, extending from the main body of the member 34 in the same direction as feet 42 and 44. The wiring device mounting tab 54 is provided with a threaded opening 90 to receive the mounting screw or bolt 122 of an electrical wiring device such as a plug receptacle or switch.

Referring again to FIG. 1, the exploded view shows slots 58 and 60 for receiving the edges 52 and 50, respectively of clamp and wiring device mounting member 34. Slots 58 and 60 in box walls 16 and 18, respectively, run a portion of the distance from the forward opening of the box toward the rear wall 20 and serve to receive and position member 34 flush against the inside face of box wall 12. When the member 34 is inserted in the mounting slots 58 and 60, serrated edges 52 and 50 engage walls 16 and 18 of the wiring box 10 helping to secure the member 34 against outward removal from slots 52 and 50. Corresponding slots 64 and 66 are provided in box walls 16 and 18, respectively, at the opposite end of box 10 where clamp and wiring device mounting member 62 is shown in FIG. 1 in place in slots 64 and 66.

End walls 12 and 14 of wiring box 10 further include protrusions 68 and 70, respectively, which extend into the box chamber and run a portion of the distance from the forward opening of wiring box 10 to its rear wall 20. As can best be seen in the case of protruding member 68 in box wall 12, there is a channel 74 formed exterior to the box chamber in wall 12. Opposed slots 78 and 80 in the protrusion communicate between the box chamber and channel 74 and extend a portion of the length of protrusion 68 from the forward opening of box 10 toward its rear wall 20. Slots 78 and 80 are adapted to slideably receive the main body portion 36 of member 34 so that leg portions 38 and 40 straddle protrusion 68 to position the member 34 between the protrusion 68 and box wall 12. Corresponding elements are provided in protrusion 70 and box end wall 14 where member 62 is shown in place.

As can best be seen in the rear view of clamp and wiring device mounting member 34 in FIG. 1, a detent tab 82 extends outwardly from the main body portion 36 of the member 34 in a direction opposite to that of feet 42 and 44. When member 34 is inserted into receiving slots 58, 60, 78, and 80 of the wiring box, the detent tab 82 is deflected inwardly toward main body portion 36 until the tab 82 is free to restore to its original position into channel 74. The clamp and wiring device mounting member is then restrained against outward removal from the receiving slots by the end of detent tab 82 bearing against shoulder 86 provided in channel 74 by a portion 94 of wall 12 extending across the channel 74.

Figure 2:
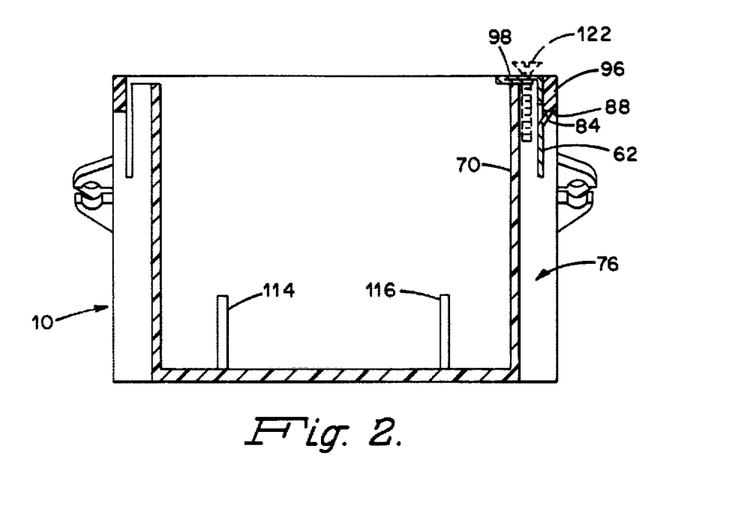
FIG. 2 is a cut-away side view of the wiring box arrangement of FIG. 1, the cut taken along line 2—2 of FIG. 1.

Details of the latching detent are best seen in FIG. 2 where member 62 is shown latched in place in wiring box 10 in a sectional side view. Detent tab 84 is shown in its normally restored position in channel 76, with the outer end of detent tab 84 bearing against the shoulder 88 formed by the box wall region 96 which bridges channel 76. When thus latched in place, member 62 is prevented from moving out of its box wall receiving slots by detent latch 84, and prevented from moving further into the box by the action of the bottom surface of wiring device mounting tab 98 bearing against the top of box wall protrusion 70.

Figure 7:
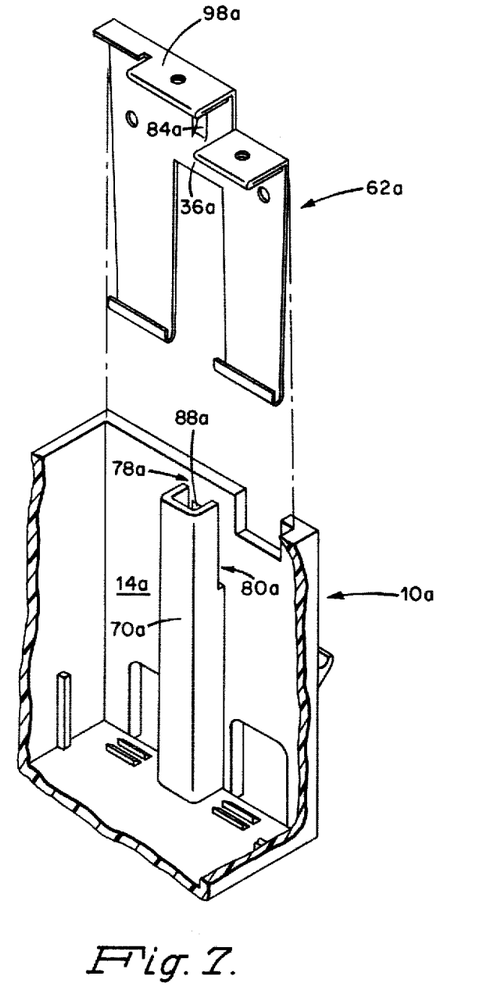
FIG. 7 is a partial cut-away perspective view of a wiring box arrangement in accordance with an alternative embodiment of the invention.
Figure 8:
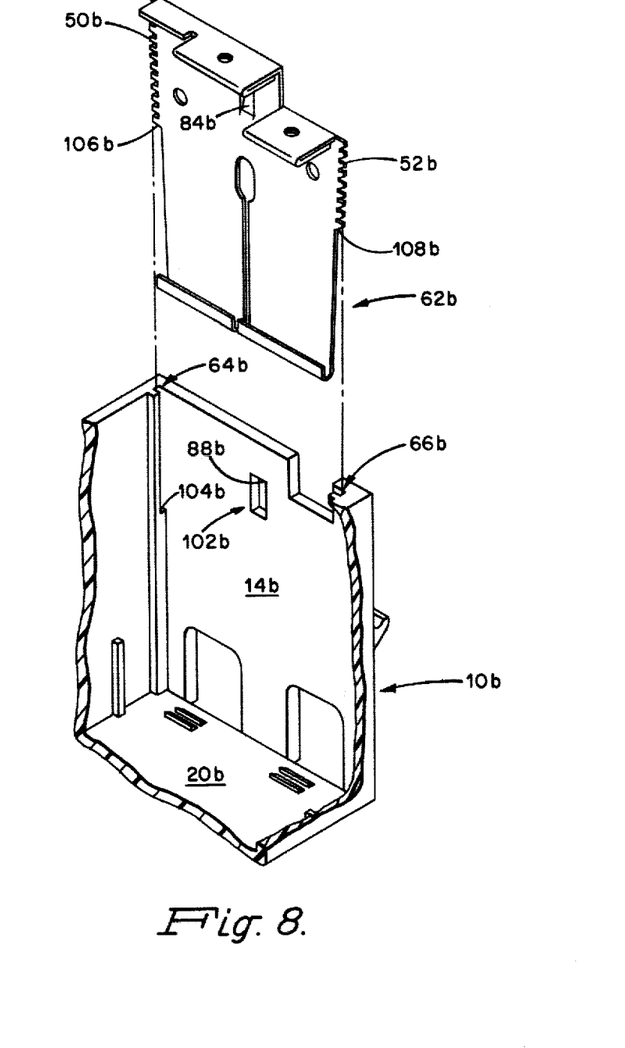
FIG. 8 is a partial cut-away perspective view of a wiring box arrangement in accordance with another alternative embodiment of the invention.

Alternative embodiments of the electrical wiring box arrangement are shown in FIGS. 7 and 8 in partial cut-away views. In FIG. 7, wiring box 10a is provided with protrusion 70a in box end wall 14a. Slots 78a and 80a in protrusion 70a slideably receive the main body portion 36a of clamp and wiring device mounting member 62a to position the member 62a flush against the inner face of box wall 14a.

In a manner similar to that detailed above, member 62a is retained in proper position in the wiring box 10a by detent latch 84a bearing against shoulder 88a and by the lower surface of wiring device mounting tab 98a bearing against the top of protrusion 70a.

In the embodiment of the invention shown in FIG. 8, wiring box 10b is provided with slots 64b and 66b in the front-to-rear walls for slideably receiving the edges 50b and 52b of clamp and wiring device mounting member 62b. Slots 64b and 66b run a portion of the distance from the forward opening of wiring box 10b toward its rear wall 20b, ending in shoulders typified by 104b. When the member 62b is slideably received in slots 64b and 66b, the member moves into the slots until the leading part 106b of edge 50b bears against shoulder 104b, preventing further movement of the member into the box. Detent latch 84b engages shoulder 88b of aperture 102b in box wall 14b to prevent removal of the member from the slots.

Referring again to FIG. 1, foot regions 42 and 44 of member 62 are shown spaced apart from rear wall 20 and cable engaging protrusions 28 and 30, respectively. The spacing is preferably slightly less than the diameter of the electrical cable to be clamped in the knock-out aperture. This relative configuration of the cable engaging foot portion of each leg and the cable engaging protrusions in the box wall permits a non-metallic sheathed electrical cable to be firmly clamped in a knock-out aperture of the wiring box as shown in FIG. 3. An electrical cable 100 inserted through knock-out aperture 26 in box wall 14 deflects the leg portion 40 inwardly into the box chamber, causing the cable 100 to lie along wall 20 of the box contacting cable engaging protrusion 30. The resiliency of the clamp member causes the leg 40 to restore to its original position forcing heel 48 against the cable 100, in turn forcing the cable against protrusion 44. Any attempt to pull the cable from the knock-out in an outward directin increases the forces of the clamp heel and box wall protrusion bearing oppositely against the cable.

Figure 4:
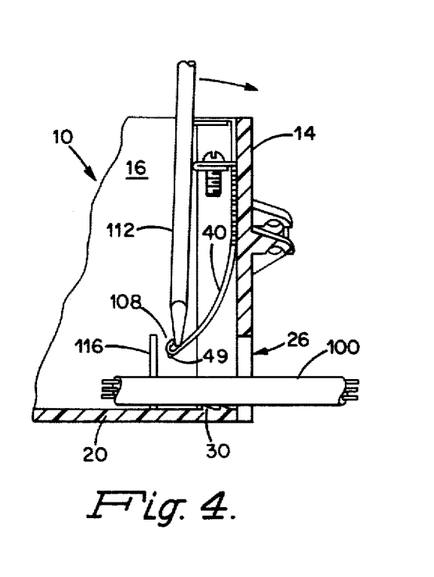
FIG. 4 is a partial cut-away side view of the wiring box arrangement of FIG. 1, the cut taken along line 3—3 of FIG. 1, showing an electrical cable passing through a wall of the box and the shank of a screwdriver being used to release the cable.

A clamped cable is easily removed from or repositioned in a knock-out aperture by prying the free end of the clamp leg away from the cable as shown in FIG. 4. The bit of a screwdriver 112 or similar tool is inserted in the J-shaped foot portion of the leg portion 40 of the clamp and the clamp leg is pried away from the cable.

As further shown in FIGS. 3 and 4, wiring box arrangements in accordance with one embodiment of the invention include stops in the wall structure of the box to prevent excessive flexure of the cable clamp leg into the box chamber. The stops, typified by stop 116 are protrusions in the side walls of the wiring box, each protrusion located in a wall perpendicular to the wall having the cable clamp attached. For example, in FIG. 4 stop 116 is located in side wall 16 in close proximity to end wall 14 having the clamp and wiring device mounting member attached. Excessive bending of a clamp leg into the box chamber is prevented by the foot portion of the clamp striking the sidewall stop.

Referring to either FIG. 1 or FIG. 5, the clamp and wiring device mounting member 34 of a preferred embodiment of the invention has an electrical grounding lug or tab 56 formed at a substantially right angle to the main body portion 36 of the member 34. The grounding lug 56 is provided with a threaded screw-receiving hole 92 and screw 120. The wiring box 10 of the most preferred embodiment of the invention is fabricated of a molded one-piece synthetic resin with the member 34 formed in one piece of metal. Electrical grounding of a wiring device mounted in this wiring box arrangement is achieved by attaching the metal mounting studs of the wiring device (not shown) to mounting tabs 54 of the member 34 and attaching the ground conductor of the electrical cable to the grounding lug of the member. An electrically conductive pathway between the metal mounting stud of the wiring device and the ground conductor of the cable is provided through the metal body of member 34.

Figure 6:
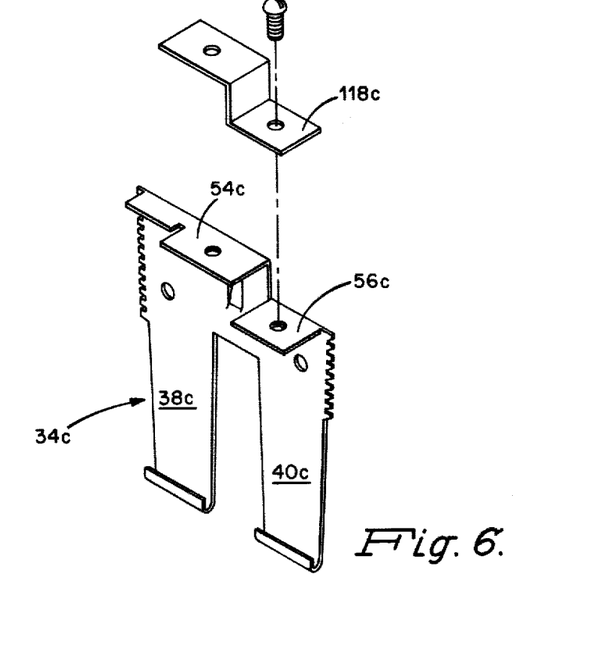
FIG. 6 is an exploded perspective view of a clamp member of a wiring box arrangement in accordance with an alternative embodiment of the invention.

In an alternative embodiment shown in FIG. 6, the member 34c is fabricated of a flexible synthetic resin. An electrically conductive pathway between the metal mounting studs of the wiring device and the ground conductor of an electrical cable is provided by metal grounding strap 118c.

While there have been shown and described what are at present considered the preferred embodiments of the invention, it will be obvious to those skilled in the art that various changes and modifications may be made therein without departing from the scope of the invention as defined by the appended claims.

What is claimed is:

1. An electrical wiring box arrangement comprising an electrical wiring box in combination with a clamp and wiring device mounting member;

said wiring box including a wall structure having front to rear walls and a rear wall therebetween which in combination define a chamber having a forward opening for receiving an electrical wiring device, said wall structure including:

a knock-out region for providing a knock-out opening for receiving a cable, first cable engaging means, and positioning means for positioning said clamp and wiring device mounting member adjacent to said knock-out region in said box wall structure;

said clamp and wiring device mounting member including:

securing means coacting with said mounting means of said wall structure for attaching said clamp and wiring device mounting member to said box wall structure, second cable engaging means for coacting with said first cable engaging means to clamp a cable passing through a knock-out opening in said box wall structure, and means for mounting an electrical wiring device on said clamp and wiring device mounting member.

2. An electrical wiring box arrangement in accordance with claim 1 wherein said clamp and wiring device mounting member comprises a flexible, resilient member having a substantially flat main body portion and a deflective leg portion essentially coplanar with said main body portion, said main body portion having a first and second end regions and first and second edges, said leg portion contiguous at a first end thereof with said first end region of said main body portion, said leg portion having said second cable engaging means at the seocnd end thereof; said means for mounting an electrical wiring device contiguous with said second end region of said main body portion.

3. An electrical wiring box arrangement in accordance with claim 2 wherein said positioning means comprises opposed slots in said front-to-rear wall structure of said wiring box for slideably receiving said first and second edges of said clamp and wiring device mounting member whereby said member is positioned in said box chamber flush against a front-to-rear wall having a knock out region therein.

4. An electrical wiring box arrangement in accordance with claim 3 including a plurality of serrations in first and second edges of said main body portion of said clamp and wiring device mounting member whereby when said member is slideably received in said slots, said edges engage said front-to-rear box walls to restrain said member from removal from said slots.

5. An electrical wiring box arrangement in accordance with claim 2 wherein said second cable engaging means comprises a foot portion of said leg portion, said foot portion comprising a J-shaped region of said leg portion whereby the heel of said foot portion provides a cable gripping edge.

6. An electrical wiring box arrangement in accordance with claim 5 wherein said foot portion is further provided with a plurality of cable engaging protrusions.

7. An electrical wiring box arrangement in accordance with claim 5 wherein said wiring box wall structure includes abutment means for positioning said foot portions of said clamp member leg portions spaced apart from said second cable engaging protrusion in said box rear wall whereby a cable passing through said knock-out aperture deflects said leg portion of said clamp member inwardly into said box chamber, clamping said cable between said clamp member heel edge and said second cable engaging protrusion.

8. An electrical wiring box arrangement in accordance with claim 1 wherein said positioning means comprises a protrusion in said front-to-rear wall structure, said protrusion extending into said box chamber and running a portion of the distance from said forward opening toward said rear wall, said protrusion having a channel exterior to said chamber, said channel running a portion of the length of said protrusion, and slots in said protrusion, said slots communicating between said chamber and said channel and running a portion of the length of said protrusion from said forward opening toward said rear wall, said slots adapted for slideably receiving said main body portion of said clamp and wiring device mounting member to position said member flush against a front-to-rear wall having a knock-out region therein.

9. An electrical wiring box arrangement in accordance with claim 8 wherein said clamp and wiring device mounting member comprises a flexible, resilient bifurcated member having a substantially flat main body portion and first and second deflective leg portions essentially coplanar with said main body portion, said main body portion having first and second end regions and first and second edges, said leg portions contiguous at a first end of each thereof with said first end region of said main body portion, each of said leg portions having said second cable engaging means for mounting an electrical wiring device contiguous with said second end region of said main body portion, whereby when said clamp and wiring device and mounting member is slideably received in said protrusion slots, said main body portion is positioned in said slots and said leg portions straddle said protrusion.

10. An electrical wiring box arrangement in accordance with claim 3 or 9 wherein said front-to-rear wall structure includes shoulder means and said clamp and wiring device mounting member includes detent means extending outward from said main body portion of said member, said detent means adapted to engage said shoulder means whereby said clamp and wiring device mounting member is restrained from removal from said wiring box when received in said positioning means.

11. An electrical wiring box arrangement in accordance with claim 2 or 9 wherein said means for mounting an electrical wiring device comprises a tab formed at a substantially right angle to said main body portion of said clamp and wiring device mounting member, said tab having screw-receiving means adapted to receive an electrical wiring device mounting screw.

12. An electrical wiring box arrangement in accordance with claim 2 or 9 wherein said first cable engaging means comprises a protrusion in said rear wall structure of said box adapted to engage the sheath of a cable passing through said knock-out opening.

13. An electrical wiring box arrangement comprising a synthetic resin electrical wiring box and a clamp and wiring device mounting member;
  said wiring box including a wall structure having front-to-rear walls and a rear wall therebetween which in combination define a chamber having a forward opening for receiving an electrical wiring device, said wall structure including:
    a knock-out region for providing a knock-out aperture for receiving a cable;
    a first cable engaging protrusion integrally molded in said wall structure;
    positioning means for positioning said clamp and wiring device mounting member in said box chamber adjacent to said knock-out region;
  said clamp and wiring device mounting member comprising:
    a flexible, resilient bifurcated member having a substantially flat main body portion and two deflective leg portions essentially coplanar with said main body portion, said main body portion having first and second end portions and first and second edges, said leg portions contiguous at a first end of each thereof with said first end of said main body portion, said leg portions having a foot portion at a second end of each thereof, said foot portions each comprising a J-shaped region of each leg portion whereby the heel edge of each foot portion provides said second cable engaging means,
  electrical wiring device mounting means including a tab contiguous with said second end of said main body portion,
    electrical grounding attachment means, and electrical conductive pathway means connecting said electrical wiring device mounting means and said electrical grounding attachment means.

14. An electrical wiring box arrangement in accordance with claim 13 wherein said positioning means comprises opposed slots in said front-to-rear walls of said wiring box for slideably receiving said first and second edges of said main body portion of the clamp and wiring device mounting member whereby said member is positioned in said box chamber flush against a front-to-rear wall having a knock-out region therein.

15. An electrical wiring box arrangement in accordance with claim 13 wherein said positioning means comprises a protrusion in said front-to-rear walls, said protrusion extending into said chamber and running a portion of the distance from said forward opening to said rear wall, said protrusion having a channel exterior to said chamber, said channel running a portion of the length of said protrusion, and slots in said protrusion, said slots communicating between said chamber and said channel and running a portion of the length of said protrusion from said forward opening of the wiring box to its rear wall, said slots adapted for slideably receiving said main body portion of said clamp and wiring device mounting member to position said clamp member flush against a front-to-rear wall having a knock-out region therein.

16. An electrical wiring box arrangement in accordance with claim 15 wherein said positioning means comprises a protrusion in said front-to-rear wall structure, said protrusion extending into said box chamber and running a portion of the distance from said forward opening toward said rear wall, said protrusion having a channel exterior to said chamber, said channel running a portion of the length of said protrusion, and slots in said protrusion, said slots communicating between said chamber and said channel and running a portion of the length of said protrusion from said forward opening toward said rear wall, said slots adapted for slideably receiving said main body portion of said clamp and wiring device mounting member to position said member flush against a front-to-rear wall having a knock-out region therein.

17. An electrical wiring box arrangement in accordance with claim 14 or 15 wherein said box wall structure further includes abutment means to position said clamp and wiring device mounting member so that said heel portion of each of said member leg portions is maintained spaced apart from said first cable engaging protrusion in said box wall structure by a distance less than the thickness of an electrical cable whereby said cable inserted in a knock-out aperture in said box wall structure deflects said member leg portion inwardly into said box chamber and is clamped by said member heel edge and said wall cable engaging protrusion bearing oppositely against said cable.

18. An electrical wiring box arrangement in accordance with claim 15 or claim 16 wherein said clamp and wiring device mounting member securing means comprises detent means extending outwardly from said clamp member and adapted to abut shoulder means in said front-to-rear wall structure of the wiring box whereby said clamp member is restrained from removal from said wiring box when received in said clamp member mounting means.

19. An electrical wiring box arrangement in accordance with claim 13 wherein said securing means comprises a plurality of serrations in said first edge and said second edge of said main body portion of said clamp member adapted to engage the front-to-rear walls of said wiring box whereby the clamp member is restrained against removal from said slots when inserted thereinto.

20. An electrical wiring box arrangement in accordance with claim 13 wherein said clamp and electrical wiring device mounting member is formed of an electrically non-conductive material and said electrical conductive pathway means comprises a metal strap connecting said wiring device mounting means and said electrical grounding attachment means.

21. An electrical wiring box arrangement in accordance with claim 13 wherein each of said foot portions is provided with a plurality of protrusions on said heel edge for engaging the sheath of an electrical cable.

* * * * *